Jan. 28, 1936. E. J. GRAF Re. 19,836
ILLUMINATED ORNAMENTAL DEVICE FOR DECORATIVE PURPOSES
Original Filed March 13, 1931 2 Sheets-Sheet 1
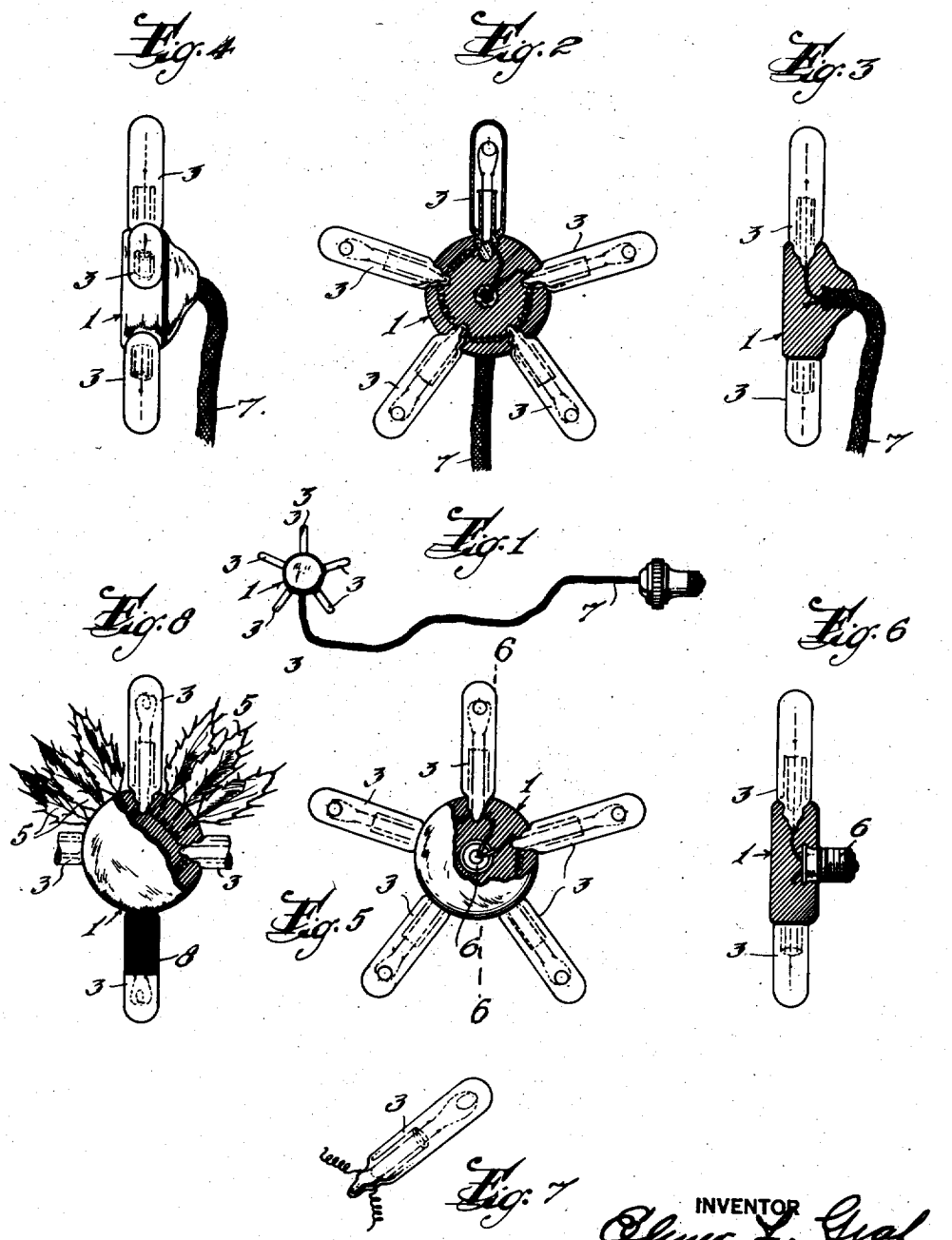
INVENTOR
Elmer J. Graf
BY
Frank C. Fischer
ATTORNEY Jan. 28, 1936. E. J. GRAF Re. 19,836

ILLUMINATED ORNAMENTAL DEVICE FOR DECORATIVE PURPOSES

Original Filed March 13, 1931 2 Sheets-Sheet 2

INVENTOR
Elmer J. Graf
BY
Frederick E. Fischer
ATTORNEY

Reissued Jan. 28, 1936

Re. 19,836

UNITED STATES PATENT OFFICE 19,836

ILLUMINATED ORNAMENTAL DEVICE FOR DECORATIVE PURPOSES

Elmer J. Graf, Roselle Park, N. J., assignor to G. B. G. Corporation, Newark, N. J., a corporation of New Jersey Original No. 1,923,144, dated August 22, 1933, Serial No. 522,275, March 13, 1931. Application for reissue January 21, 1935, Serial No. 2,736

9 Claims. (Cl. 176—16)

This invention relates to improvements in decorative electrical devices, and more particularly is directed to electrically illuminated ornamental units such as are used on Christmas trees, holiday decorations, and the like.

An object of my invention is to provide an improved unit of the character described comprising few and simple parts, which is compact and complete in itself, may be plugged or screwed directly into an electric light socket, and has no loose parts which may be subjected to tampering and removal.

A further object of my invention is to provide a device of the character described comprising a plurality of bulbs electrically connected in predetermined spaced relation to each other to represent any of a number of various symbols, and a homogeneous holding element uniting said bulbs with a plug or plug cord into a unitary structure.

These and other advantageous objects, which will later appear, are accomplished by the simple and practical construction and arrangement of parts hereinafter described and exhibited in the accompanying drawings, forming part hereof, and in which:

Figure 1 represents a front elevational view of one form of my invention, in which the plug is separate from and secured to the holding element by means of a flexible cord.

Figure 2 represents a partial fragmentary and partial sectional view thereof, showing the method of connecting the bulbs and flexible cord, in the holding element.

Figure 3 represents a partial sectional side elevational view taken on line 3—3 of Figure 1.

Figure 4 represents a side elevation view of this form of my invention.

Figure 5 represents a partial sectional front elevational view of a form of my invention in which the plug is embedded in the holding element, and forms a unitary structure with the bulbs and said holding element.

Figure 6 represents a partial sectional side elevational view taken on line 6—6 of Figure 5.

Figure 7 represents a perspective view of one of the bulbs and its terminal wires, used with my invention.

Figure 8 represents a fragmentary partial sectional front elevational view of a form of my invention in which additional ornamentation, such as holly leaves or tinsel, as shown, is embedded within the holding element, and in which an opaque or semi-opaque coating is applied to a bulb to create a hazy effect or to create the effect of only a small portion of the bulb being lighted.

Figure 11:
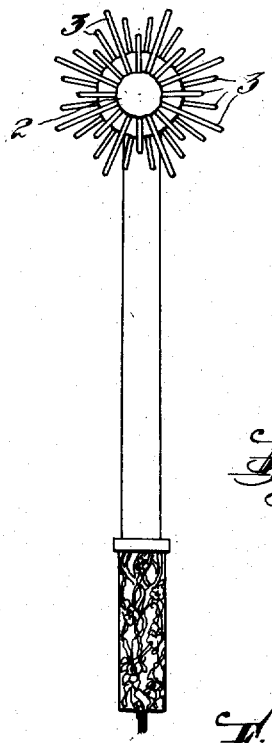
Figure 11 represents a front elevational view of a unit of this type applied to a candle holder.
Figure 12:
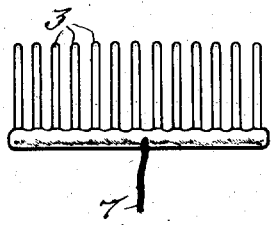
Figure 12 represents a front elevational view of a form of my invention wherein the holding element is given the form of a rod-like candle holder, the bulbs being arranged in line thereon, to simulate the appearance of a group of candles arranged on a holder.

As shown in the accompanying drawings, my invention comprises essentially the electrical unit 1, consisting of the electric bulbs or exhausted envelopes 3, arranged in spaced relation to each other, to represent any of a number of various symbols, such as the star form shown in Figure 2, or the crucifix form shown in Figure 8, or the candle form, shown in Figures 11 and 12.

Figure 10:
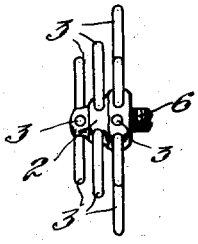
Figure 10 represents a side elevational view of a form of my invention wherein several layers of bulbs are arranged in the holding element, in staggered relation to each other.

Unique and attractive ornamental effects may be obtained by arranging the bulbs preferably in staggered relation, in two or three parallel layers, as shown in Figures 10 and 11, in one holding element 2.

Figure 9:
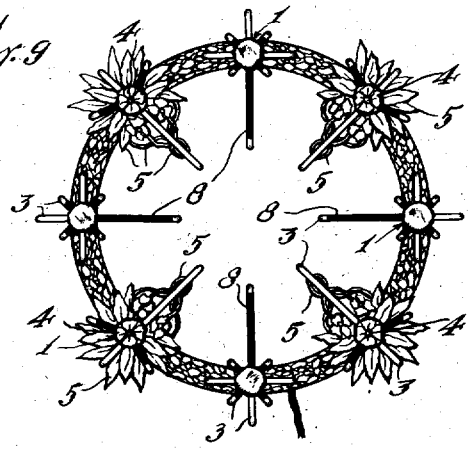
Figure 9 represents a front elevational view of a wreath to which a plurality of my improved units, embodying the features shown in Figure 8, are applied.
Figure 13:
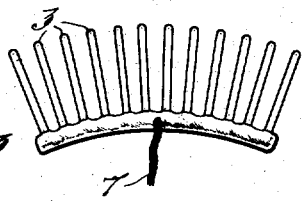
Figure 13 represents a similar view, in which the holding element is arced to create an arced candle effect.
Figure 14:
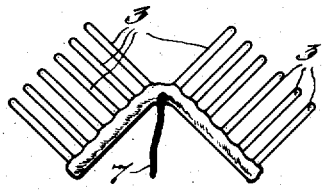
Figure 14 represents a similar view, in which the holding element is angularly bent midway its length to create the effect of two angularly arranged groups of bulbs.

The bulbs in each unit may be connected in series or parallel, and the bulb connections are embedded within and protected by the holding element 2, which, in its preferred form may consist of suitable moldable material formed to represent any desired configuration, such as the flower ornamentations 4 of the holding elements shown in Figure 9, and may be curved or bent, as shown in Figures 13 and 14, into any desired shape.

The holding element 2 may be provided with additional ornamentation by embedding therein holly leaves or tinsel 5, as shown in Figures 8 and 9.

Electrical connection of the unit may be made by means of the plug 6, either secured to one side of the holding element 2 and unitary therewith, as shown in Figure 6, or separate from the holding element 2 and connected thereto by a flexible electric cord 7, as shown in Figure 1.

The arrangement of alternate forms of units creates a highly ornamental effect, as is seen from Figure 9 wherein alternate forms of units are arranged on a wreath, which may be provided with electric sockets into which the units may be directly plugged or screwed.

Figure 15:
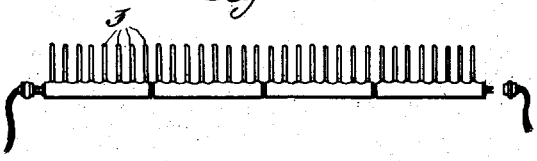
Figure 15 represents a front elevational view of an arrangement of a series of units of the type shown in Figure 12, to create a long, continuous row of candles effect.

By grouping a series of units of the same type together, ornamental effects may be obtained, as is shown in Figure 15, wherein a continuous candle effect is obtained by grouping several units of the candle type shown in Figure 12 together, and for this purpose the units may be provided with any desired or convenient interlatching members.

By arranging units back to back, in staggered relation, the exposed ends of the bulbs of both units may be seen from either side.

The bulbs 3 may be given any color or combination of colors desired, for religious or holiday occasions, and may be partially coated with opaque or semi-opaque substances 8 as shown in Figures 8 and 9, to provide for illumination of only selected portions of the bulbs.

To manufacture the units described, it is merely necessary to first so arrange the bulbs 3 relatively to each other, in a suitable mold (not shown) as to represent the symbol desired, and to electrically connect the bulbs with the plug 6, in the type of unit shown in Figure 6, or to electrically connect the bulbs with the flexible electric cord 7 in the type of unit shown in Figure 1, and, if desired, additional ornamental elements, such as the holly leaves or tinsel 5 shown in Figures 8 and 9 may be placed in the mold, and then a suitable moldable material constituting the holding element 2 is poured into the mold uniting with the bulbs and plug, in the type of unit shown in Figure 6, or with the bulbs and flexible cord 7, in the type of unit shown in Figure 1, and also the holly leaves or tinsel 5, in the type of unit shown in Figure 8, to form a unitary structure.

It will be noted that the device thus made is complete in itself as an electric unit, does not require assembling by the user, has no loose parts which may be tampered with or lost, and is ready to be plugged or screwed into an electric socket.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. A device of the character described, comprising a base of moldable material, a plurality of exhausted envelopes spaced apart and mechanically independent of each other and permanently embedded directly in said moldable material, filaments in said envelopes, and conductors connecting the filaments said conductors being embedded in the base.

2. A device of the character described, comprising a base of moldable material, a plurality of exhausted envelopes spaced apart and mechanically independent of each other and permanently embedded directly in said moldable material, filaments in said envelopes, a plug embedded in the base, and conductors connecting the filaments and the plug, said conductors being embedded in the base.

3. A unitary decorative device of the character described, including a holder, a plurality of lamp bulbs mounted at one end in, and arranged in a plurality of groups on said holder and connected in circuit arrangement within the holder, the bulbs in a group being of different mechanical dimensions and presenting different electrical characteristics, and plug connection means directly attached to and extending from one face of the holder for attaching and supporting the holder in a socket, said means being electrically connected within the holder to said bulbs for supplying current thereto.

4. A unitary decorative device as set forth in claim 3, further characterized in that the different groups of lamp bulbs are arranged in different parallel planes.

5. A unitary decorative device of the character described, including a holder having attachment plug fastened to one face thereof, a plurality of light-dispersing members having illuminating means consisting of filaments carried at one end only by said holder, said light-dispersing members being arranged in a plurality of groups, the groups being arranged in parallel adjacent planes, and said filaments being electrically connected to said plug within said holder.

6. A unitary decorative device of the character described, including a holder, a plurality of exhausted envelopes permanently carried directly by said holder, said envelopes containing filaments and being arranged in a plurality of groups in staggered relation to each other, the groups being arranged in adjacent planes, the filaments of each group being connected in series, and a single plug extending from one face of said holder for supporting the holder in a socket and for conveying current to all of said filaments.

7. A unitary decorative device of the character described including, a holder having an electrical connection plug protruding therefrom whereby the unit may be connected directly to a current supply receptacle and supported therefrom, independently constructed light-dispersing members extending radially from the holder and gripped at one end directly by the holder, and hermetically sealed in light-producing means within said light-dispersing members and adapted to be supplied with current from said plug.

8. A unitary decorative device of the character described including, a holder body having a decorative exposure face, an electrical connection plug located axially of said body and protruding from the face opposite said decorative face whereby said device may be substituted for an ordinary miniature lamp in a decorative lighting set, a plurality of independently constructed translucent bodies protruding radially from the rim of said body and secured therein and adapted to pass light from light-producing means, and sealed-in lamp filament light-producing means disposed within said translucent bodies for passing light therethrough, said filament means terminating directly in said connection plug.

9. A unitary decorative device of the character described including, a holder structure having a threaded connection plug directly affixed thereto and protruding symmetrically from the rear face thereof, said holder having radially positioned seat portions and glass members each provided with a shank permanently fixed in said seat portions and with a body portion protruding radially from said holder, said glass member having an overall diameter of substantially the thickness of that part of the holder from which they protrude, and filament means disposed within said glass members and serving to cause said glass members to pass light therethrough, said filament means terminating directly in said plug.

ELMER J. GRAF.